United States Patent [19]

Reynolds

[11] Patent Number: 5,179,869
[45] Date of Patent: Jan. 19, 1993

[54] CHANGING SPEED IN A POWER TRANSMISSION

[75] Inventor: Joseph D. Reynolds, Climax, Mich.

[73] Assignee: Eaton Corporation, Cleveland, Ohio

[21] Appl. No.: 827,779

[22] Filed: Jan. 29, 1992

[51] Int. Cl.⁵ .................. B60K 20/00; F16H 21/44
[52] U.S. Cl. .................................... 74/473 R; 74/110
[58] Field of Search ........................... 74/110, 473 R

[56] References Cited

U.S. PATENT DOCUMENTS

| | | | |
|---|---|---|---|
| 3,310,992 | 3/1967 | Stott | 74/473 R |
| 4,531,425 | 7/1985 | Takahashi | 74/473 R X |
| 4,572,018 | 2/1986 | Hausinger | 74/473 R X |
| 4,757,726 | 7/1988 | Yamaguchi et al. | 74/473 R |

FOREIGN PATENT DOCUMENTS

| | | | |
|---|---|---|---|
| 150208 | 7/1937 | Austria | 74/473 R |
| 3842818 | 5/1990 | Fed. Rep. of Germany | 74/473 R |
| 0224760 | 10/1987 | Japan | 74/473 R |

Primary Examiner—Leslie A. Braun
Assistant Examiner—David W. Laub

[57] ABSTRACT

A shifting mechanism for a multi-speed manual overdrive (OD) transmission. A "flipper" reverses the action of the shift stick for the final stage shift fork to maintain progressive "H" or "HH" shift patterns yet engage a direct drive coupling as the next-to-last range and OD as the final engagement. The mechanism employs a quadrangular frame slidably received on two adjacent shift rails in a shift rail array. The frame has one side above the shift rail array notched to engage the shift stick end of an opposite side below the array. The flipper is pivotally mounted below the array with one end engaging a notch in the frame and the other end engaging the final stage shift fork so as to minimize bending stresses on the fork end and reaction loads of the sliding frame on the shift rails.

17 Claims, 4 Drawing Sheets

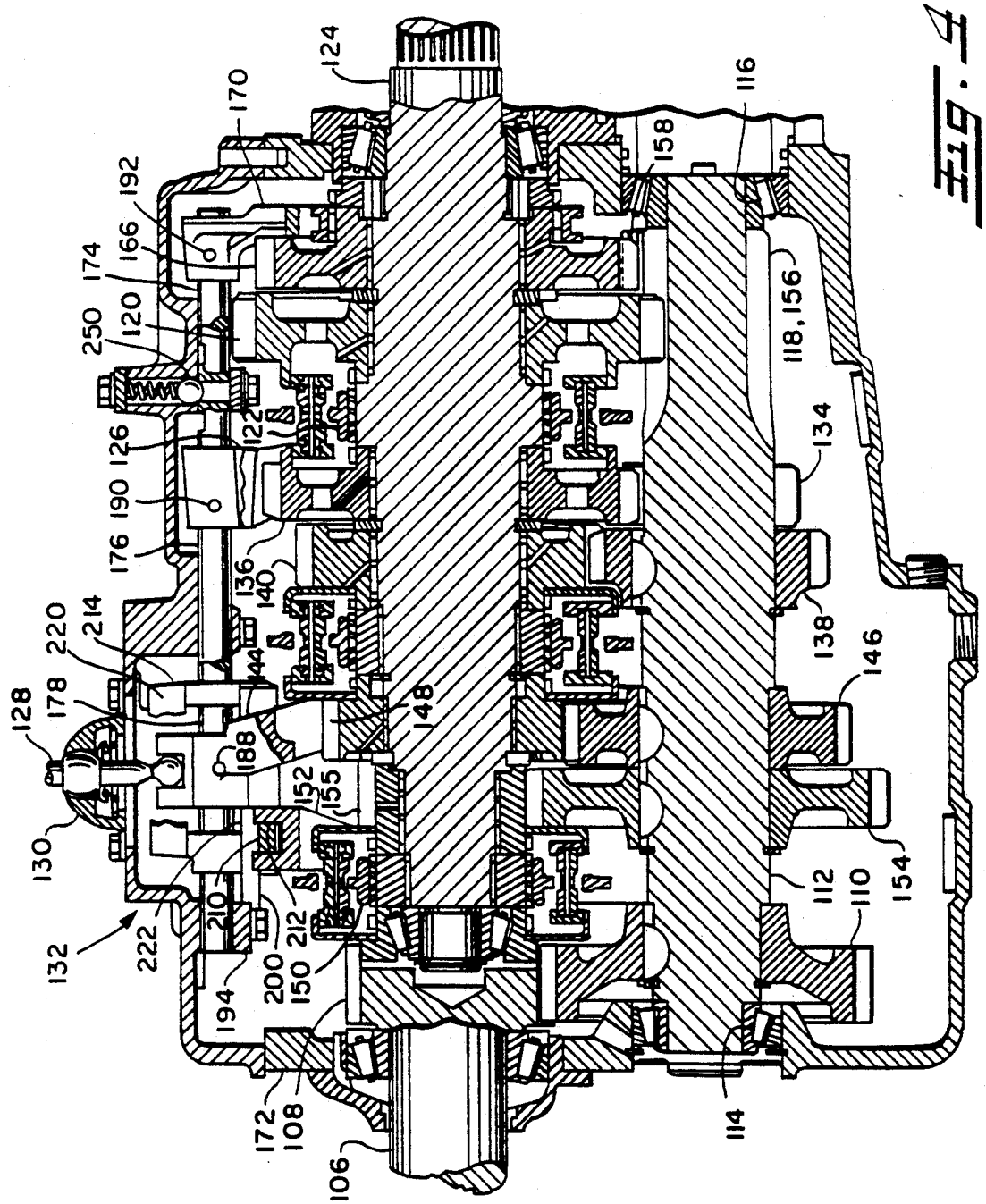

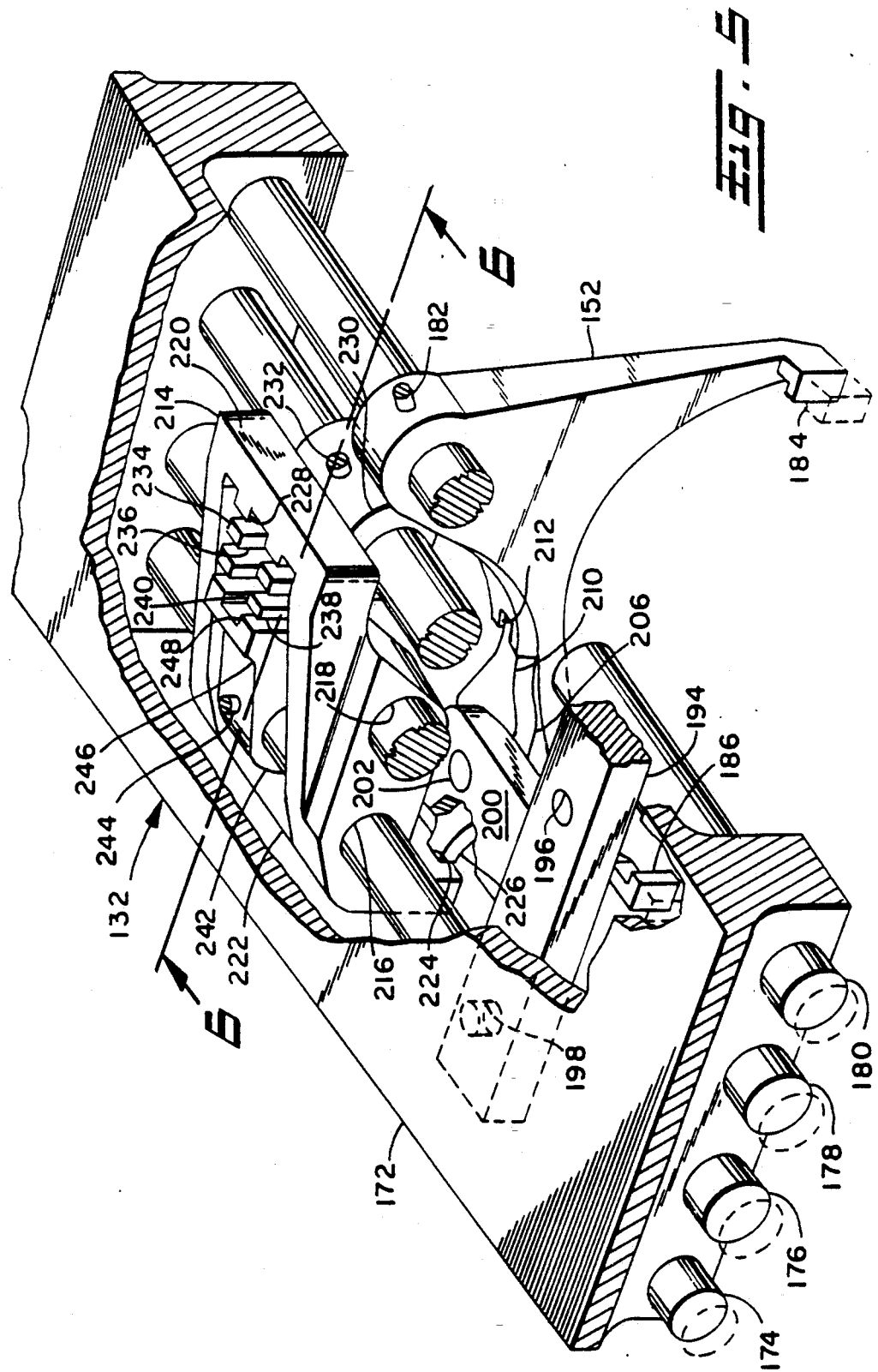

5,179,869

CHANGING SPEED IN A POWER TRANSMISSION

BACKGROUND OF THE INVENTION

The present invention relates to manual gear shifting mechanisms for power transmissions such as multi-speed transmissions employed in automotive vehicles, and particularly relates to such transmissions having the final speed range as an overdrive.

In order to maintain the shift stick or lever pattern as a conventional progressive "H" type pattern for the forward speed ranges, it has been found necessary to reverse the internal shift fork movement for the final speed changes in order to provide for the overdrive speed range to be attained in the final position of the shift stick or lever. Heretofore, this reversing of the shift fork action within the transmission for the final speed change in an overdrive transmission has been accomplished by employing a pivoted lever or "flipper" between the shift stick and the shift fork to reverse the action of the shift stick on the movement of the shift fork to cause the shift fork to engage the direct drive ratio in the next to the final position, and the overdrive ratio engagement in the final position of the shift stick.

Known techniques for mounting a shift fork reversing flipper in a manually shiftable vehicle transmission have utilized an arrangement wherein the flipper was mounted above the shift rail array on the underside of the gear box cover. Typically, in such an arrangement the flipper or lever engages the final shift fork on one end of the lever and a slider block, mounted on another shift rail, engages the lever at the end opposite the lever pivot or fulcrum. This arrangement whereby the flipper engaged the slider and final shift fork on the opposite side of the shift rail array from the side of the rail array where the shift fork loads are applied has resulted in additive effects of the bending moments on the shift fork. This in turn has resulted in increases in the reaction loads on the shift fork hub where it is joined to its rail; and also has resulted in additive moments and reaction forces of the hub of the slider block which with respect to the rail upon which it is guided for movement. In some instances this increase in reaction to forces has caused binding of the block during shifting where the slider block has a narrow hub.

Referring to FIG. 7, a known arrangement of a shift fork reversing arrangement as employed for the final stage in an overdrive transmission is indicated generally at 10, wherein the transmission housing structure or cover 12 has a flipper or lever 14 pivotally mounted about the pin 16 attached to the housing 12 on the underside of the cover portion thereof. Plural shift rails, denoted 18,20,22, are slidably guided at their ends, respectively, for axial movement on the housing 12. The shift block 24 is shown as rigidly connected to rail 22 by screw 26 for movement therewith. Block 24 has lug 28 extending upwardly therefrom, which is notched to engage one end of lever 14. A portion of a shift yoke or fork 30 is illustrated for the final stage and as slidably received on rail 18, and has upwardly-extending lug 32 which is notched to engage the end of lever 14 on the opposite side of pin 16 from the lug 28. A shift block (not shown) connected to rail 22 is selectively engaged by a shift stick or lever (not shown); and, movement of shift block 24 in one direction along rail 22 results in movement of the yoke 30 in the opposite direction.

It will be seen by those familiar with automotive power transmissions that the bending moments on the shift yoke 30 are additive, resulting in increased reaction loads on the sliding surface of the yoke 30 on rail 18. This has resulted in increased wear of the parts and resilient deflection under load which can produce sloppiness on the shifting action.

In the prior art arrangement of an overdrive transmission shift mechanism employing a flipper as shown in FIG. 7, the Neutral positioning of yoke or fork 30 is provided by spring loaded ball detenting of rail 22. Thus the Neutral positioning of yoke 30 is subject to tolerance accumulations of the engagement of lever 14 with block 24, location and fit on pin 16, and engagement of lever 14 in the notch in lug 32 on yoke 30. This tolerance accumulation in the prior art has caused sloppiness of shift action and Neutral positioning of yoke 30.

It has thus been desired to provide for conventional H type shift pattern in a multi-speed transmission having an overdrive final shift position, and to provide for long life of the shifting mechanism and precision shift action.

SUMMARY OF THE INVENTION

The present invention provides a novel shift rail fork arrangement for a six speed transmission utilizing a quadrilateral frame slidably mounted on the shift rails to engage a pivoted lever for reversing the direction of the shift lever throw to maintain the conventional progressive "H" type pattern for shifting where the transmission has the final range as an overdrive. The quadrilateral shift frame reduces the bending moments on the shift fork and the reaction forces on the frame with respect to the rails upon which it is guided.

BRIEF DESCRIPTION OF THE DRAWINGS

FIG. 4 is a cross-section of a transmission employing the present invention;

FIG. 5 is an exonometric view of the shift rail mechanism of a transmission employing the present invention;

DETAILED DESCRIPTION

Figure 1:
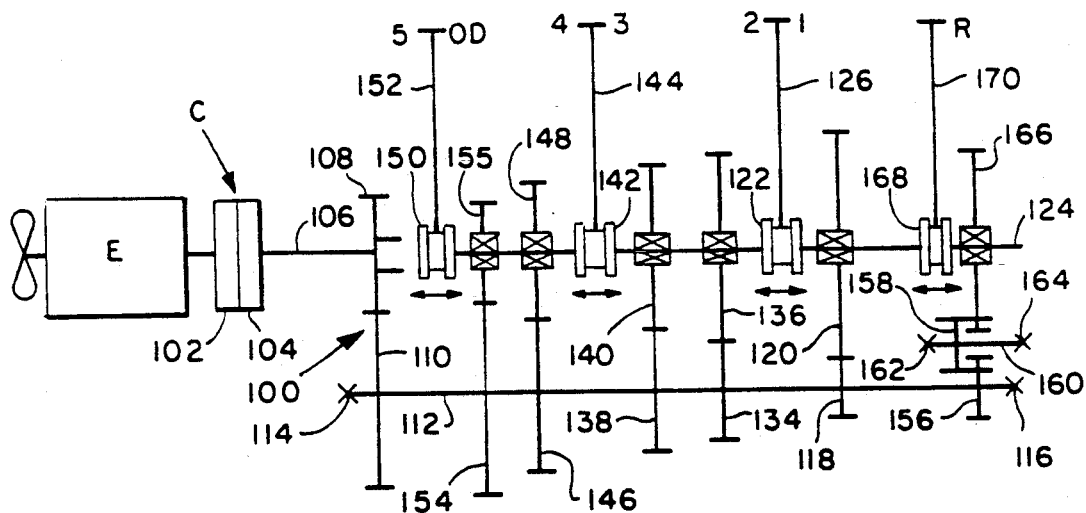
FIG. 1 is a schematic of the transmission shaft and gear arrangement.
Figure 2:
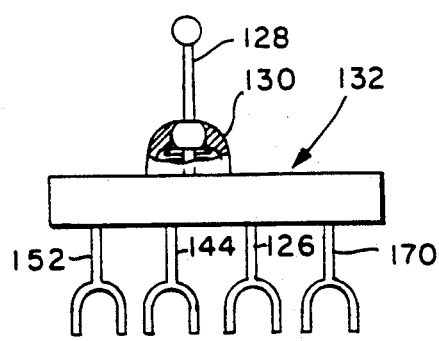
FIG. 2 is a detailed view of the shift fork arrangement.
Figure 3:
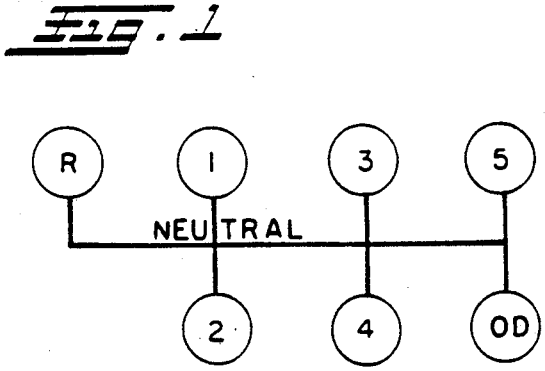
FIG. 3 is a diagram of the shifting pattern of the shift lever.

Referring to FIGS. 1, 2, and 3, the power flow of a transmission embodying the present invention is indicated generally schematically at 100.

Referring to FIG. 1, a typical power flow schematic is shown for a typical six-speed vehicle power transmission wherein the engine is denoted by the reference character E and the clutch denoted generally by the reference character C, with the clutch driver plate indicated by reference numeral 102 and the driven plate by reference numeral 104. The transmission input shaft 106 is connected to drive input gear 108, which meshes with countershaft driven gear 110, which drives countershaft 12 journalled at its ends on the casing as denoted by reference numerals 114,116.

Countershaft 112 has rigidly attached thereto in driving engagement the first speed countergear 118 which is meshed with a first speed main shaft driven gear 120, which is journalled thereon by needle bearings and is freely rotatable about main output shaft 124 which is disposed axially coincident with the input shaft 106 with its forward end journalled in the end of the input shaft. First speed driven gear 120 is engaged with output shaft 124 by movement of the dog clutch member 122 in an aftward direction to provide engagement between the hub of gear 120 and shaft 124 by movement of the shift fork 126, which has the ends thereof received over the dog clutch 122.

Referring to FIGS. 1, 2, and 3, movement of shift fork 126 is effected by movement of a shift stick or lever 128, which is pivoted on a shift tower 130 which forms a part of a shift rail deck assembly indicated generally at 132. Movement of the shift stick 128 to the position shown as the number one speed position in FIG. 3 results in movement of the shift fork 126 and dog clutch 122 to engage the first speed driven gear 120 with the output shaft 124.

Countershaft 112 has drivingly mounted thereon a second speed countergear 134, which is meshed with a second speed main shaft gear 136, which is journalled on needle bearings to rotate about main shaft 124 and is drivingly connected to the main output shaft 124 by forward movement of dog clutch 122. Forward movement of clutch 122 is effected by shift fork 126 in response to movement of lever 128 to the second speed position shown in FIG. 3.

A third speed countergear 138 is drivingly attached to countershaft 112 and is meshed with a third speed main shaft gear 140 journalled on needle bearings for free rotation about output shaft 124. A third and fourth speed dog clutch 142 is operative upon aftward movement by shift fork 144 to engage the hub of gear 140 to drive output shaft 124. Shift fork 144 is moved to the aft position by movement of the shift stick 128 to the third speed position shown in FIG. 3.

A fourth speed countershaft gear 146 is drivingly mounted on countershaft 112 and meshes with main shaft driven gear 148, which is journalled on needle bearings for free rotation about shaft 124, but is drivingly engaged with shaft 124 by forward movement of dog clutch 142 to engage the hub of gear 148. The forward movement of dog clutch 142 is effected by movement of shift fork 144 in response to positioning of shift stick 128 to the fourth speed position shown in FIG. 3.

A fifth speed is effected by forward movement of a third dog clutch 150 to engage the hub of input gear 108 to lock output shaft 124 to input shaft 106 for direct drive. The forward movement of dog clutch 150 is effected by forward movement of shift fork 152, which engages the dog clutch 150. Forward movement of fork 152 is effected by movement of shift stick 128 to the fifth speed position shown in FIG. 3, and is accomplished by a mechanism contained within shift rail deck assembly 132 in a manner which will hereinafter be described in greater detail.

The countershaft 112 has an overdrive countergear 154 drivingly attached thereto which meshes continuously with main shaft overdrive gear 156, which is journalled on needle bearings for free rotation about shaft 124 and is drivingly engaged therewith by aftward movement of dog clutch 150 to engage the hub of gear 124. Aftward movement of dog clutch 150 is effected by movement of shift fork 152 in response to movement of shift stick 128 to the overdrive position shown in FIG. 3, and is effected by a mechanism contained within shift rail deck assembly 132.

Countershaft 112 has drivingly attached thereto reverse countergear 156, which continuously meshes with a reverse idler gear 158 mounted on idler shaft 160, which is journalled on the casing or housing for rotation as denoted by reference numerals 162,164. Reverse idler 158 continually meshes with a reverse mainshaft gear 166, which is journalled on needle bearings for free rotation about output shaft 124. A fourth dog clutch 168 is provided and is operably moved by a shift fork 170 engaged therewith and upon aftward movement thereof, dog clutch 168 is moved in an aft direction to engage the hub of reverse output gear 166 to drive output shaft 124 in a reverse direction. Aftward movement of shift fork 170 is effected by movement of shift stick 128 to the reverse position as indicated in FIG. 3.

Referring to FIG. 4, the invention is shown embodied in a synchronized six forward speed range overdrive transmission; however, it will be understood that the invention may be employed in non-synchronized transmission of the type illustrated in U.S. Pat. Nos. 4,567,785 and 4,485,686, incorporated herein by reference.

Figure 6:
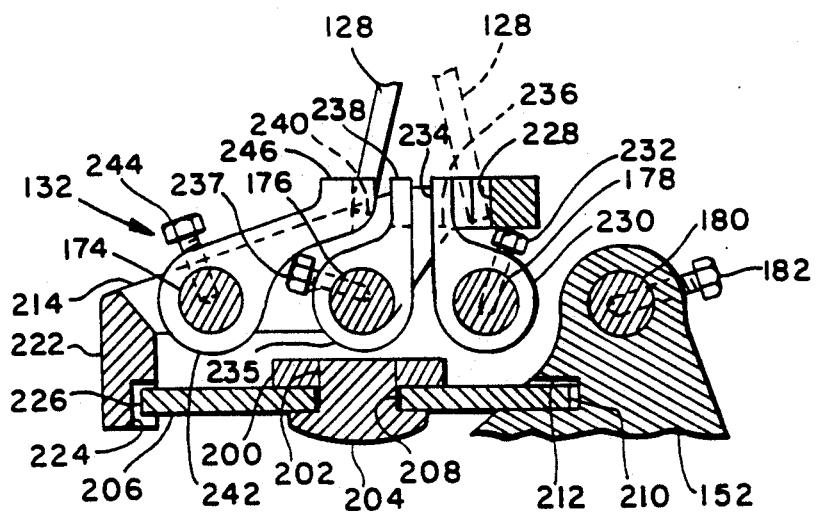
FIG. 6 is a cross-section taken along section-indicated lines 6—6 of FIG. 5; and, FIG. 7 is a view similar to FIG. 6, illustrating the prior art.

Referring to FIGS. 4, 5, and 6, the details of the shift rail subassembly 132 are shown wherein the transmission case or housing structure 172 has mounted therein in longitudinally freesliding arrangement four spaced parallel shift rails 174,176,178,180 preferably in a planar array, as illustrated in FIG. 5. The forward position of the shift rails is indicated in dashed outline in FIG. 5 and the aft position is indicated in solid outline. The outer shift rail 180 has shift fork 152 secured thereto by pin or screw 182 for axial movement therewith. The ends 184,186 engage the dog clutch 150 on the main shaft 124 for movement thereof as described above with regard to the power flow diagram in FIG. 1.

Referring particularly to FIG. 4, shift fork 144 is pinned to shift rail 178 by a pin or screw 188; and, shift fork 126 is pinned to shift rail 176 by pin or screw 190. Reverse shift fork 170 is pinned to shift rail 174 by a pin or screw 192.

Referring particularly to FIGS. 5 and 6, a bar or strap 194 is anchored to the housing 172 by suitable fasteners (not shown in FIG. 5) received through apertures 196,198 provided therein and bar 194 is disposed transversely with respect to the transmission mainshaft axis. Bar 194 has an extension or projection 200 extending centrally therefrom on the undersurface thereof in an axial direction with respect to the transmission mainshaft and has a pin 202 secured therein. A lever or flipper 206 which has an aperture 208 provided therein is journalled over the pin 202 for pivotal movement thereon; and, flipper 206 is retained by the head 204 of the pin. The right hand end 210 of lever 206 is engaged in a notch 212 formed in an inboard side of shift fork 152.

A slider frame 214 has spaced parallel bores 216,218 formed through opposite sides thereof with bore 216 received in loosely fitting or clearance arrangement over shift rail 174 and bore 218 closely interfitted in closely sliding engagement over shift rail 176 for accurately locating and positioning the frame 214 for sliding fore and aft movement along the rails 174,176.

The inboard side of frame 214 extending generally parallel to the transmission mainshaft is disposed above the shift rail array as denoted by reference numeral 220 in FIGS. 5 and 6. The opposite outboard side of the frame, denoted by reference numeral 222, is disposed on the opposite side or underneath the shift rail array. Side 222 of frame 214 has a notch 224 formed therein, which is engaged by the end 226 of lever 206 on the opposite side of pin 202 from end 210 of lever 206.

The inboard side 220 of frame 214 has a notch 228 formed on the inner surface thereof, and which is adapted for selective engagement for shift stick 128. It will be understood that upon movement of the shift stick to the fifth speed position in FIG. 3 that the stick engages notch 228 to move the frame 214 in an aft direction with respect to the transmission mainshaft, which causes flipper 206 to move shift fork 152 and its lugs 184,186 to the forward position shown in dashed outline in FIG. 5. Shift stick 128 is shown as engaging notch 228 in dashed outline in FIG. 6.

Shift rail 178 has a shifting hub 230 received thereover and pinned thereto by pin or screw 232. Hub 230 has a vertically-extending lug 234 provided thereon, and which has formed therein a notch 236 adapted for being engaged by the shift stick to effect fore and aft movement of shift rail 178 and shift fork 144.

Shift rail 176 has a shifting hub 235 received thereover and secured thereon by a pin 237, and has an upwardly-extending lug or projection 238 which is spaced adjacent lug 234 and which has a notch 240 provided therein, and which is adapted for being selectively engaged by shift stick 128.

Shift rail 174 has a shifting hub 242 received thereon and disposed intermediate the opposite transverse sides of frame 214 and secured to the rail 174 by pin or screw 244 for movement longitudinally fore and aft therewith. Hub 242 has an upwardly-extending projection 246 provided thereon, which has a notch 248 provided therein and which is adapted for engagement by shift stick 128. Movement of hub 234 by engagement of shift stick 128 with the notch 240 effects fore and aft movement of the shift rail 176 and causes movement of the shift fork 126 between the first and second speed positions. Movement of the hub 242 by engagement of shift stick 128 with notch 248 causes fore and aft movement of shift rail 174 and effects movement of shift fork 170 for engagement of the reverse gear 166 with output shaft 124.

Shift stick 128 is shown in solid outline in FIG. 6 as engaged with notch 248 in the shift hub projection 246.

Figure 7:
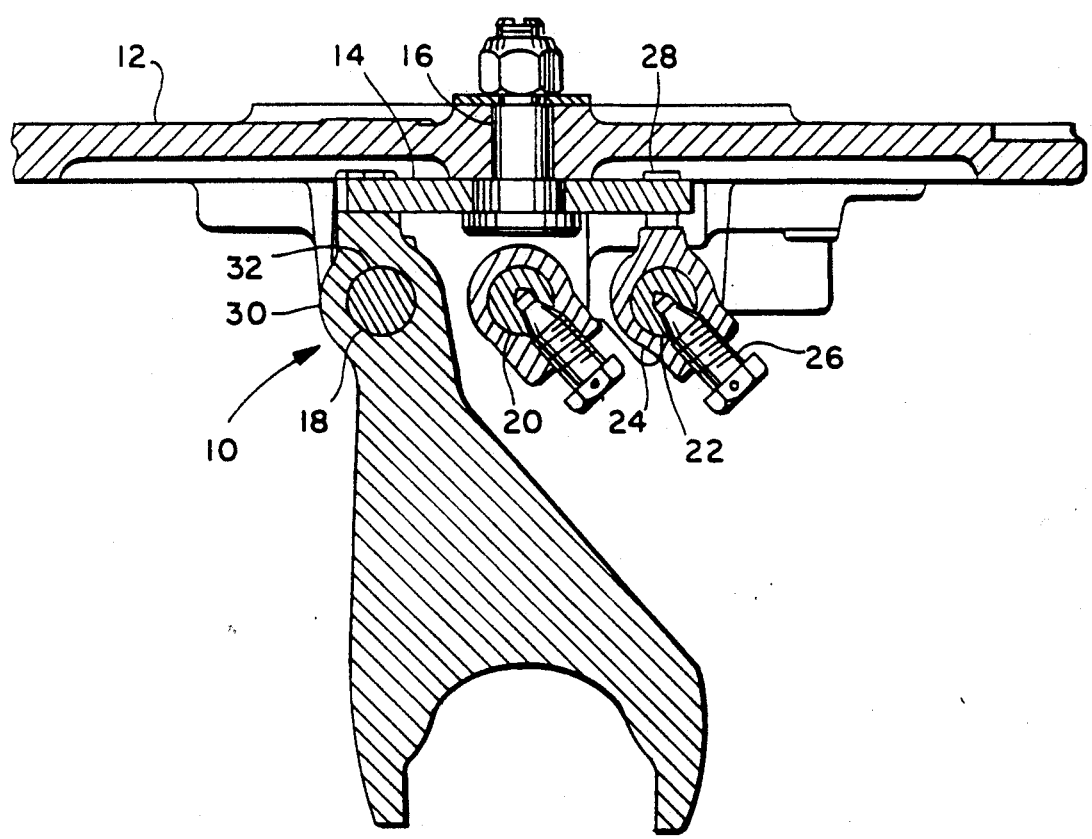

It will be understood that each of the rails 174,176,178,180 is Neutral positioned by a recess formed in the rail which is engaged by a spring loaded ball shown typically at 250 in FIG. 4. Thus the final stage shift fork 152, being pinned to rail 180, is directly Neutral positioned with rail 180. This feature of the invention overcomes the aforesaid disadvantage of the Neutral positioning of the prior art as described above with respect to FIG. 7.

The present invention thus provides an improved shifting mechanism for a multi-speed manual shift power transmission and maintains a progressive H or HH shift stick pattern where the transmission has an overdrive as the final stage. The shift stick selectively engages a slider frame slidably received over adjacent shift rails. The stick engages the frame on one side of the rail array, and the frame engages a flipper or lever mounted on the opposite side of the rail array. The end of the flipper or lever opposite the fulcrum thereof from the frame is engaged with the shift fork for the penultimate and final drive stages. Thus, the shift from the penultimate-to-final stage is reversed to accommodate direct drive for penultimate range and overdrive for the final stage.

The reaction loads on the shift rails are reduced because the flipper arrangement of the present invention applies moments to the shift fork which are subtracted from those applied by the dog clutch. The reduced rail reaction loads results in less friction and more positive movement of the shifting mechanism.

Although the present invention thus has hereinabove been described with respect to the illustrated embodiments, it will be understood to those skilled in the art that the invention is capable of modification and variation within the purview of the following claims.

I claim:

1. A shifting mechanism for a multi-speed power transmission comprising:
   (a) housing structure;
   (b) a plurality of elongated shift rails mounted on said housing structure in an array in spaced parallel arrangement, said rails mounted on said housing structure for sliding movement in the direction of elongation between fore and aft gear changing positions;
   (c) a first shift fork mounted on a first of said rails;
   (d) a second shift fork mounted on a second of said rails;
   (e) flipper means pivotally mounted on said housing structure on one side of said array, said flipper means having a first end thereof on one side of said pivotal mount engaging said second shift fork and operable upon pivoting for moving said second shift fork between said fore and aft positions;
   (f) slider means mounted for sliding on a third of said rails, said slider means operably engaging a second end of said flipper means disposed on the opposite side of said pivotal mount from said first end; and,
   (g) shift stick means pivoted on said housing structure and operable upon user movement to selectively engage said first shift fork and said slider means for moving same between said fore and aft positions, said shift stick means disposed on the side of said array opposite said flipper means.

2. The shifting mechanism defined in claim 1, wherein said slider means comprises a quadrangular frame having a plurality of spaced lugs, each having an aperture therein closely fitting said third rail; and, said slider means has an additional aperture therein loosely fitted over said first rail.

3. The shifting mechanism defined in claim 1, wherein said flipper means is mounted on the side of said array opposite said shift stick means.

4. The shifting mechanism defined in claim 1, wherein said plurality of parallel rails includes four rails with said shift stick means disposed on one side of said array and said pivot lever disposed on the opposite side of said array.

5. The shifting mechanism defined in claim 1, wherein said plurality of rails is disposed in a generally planar array; and, said slider means comprises a quadrangular frame disposed on a common side of said array with said shift stick means.

6. The shifting mechanism defined in claim 1, wherein said rails are arranged in a generally planar array.

7. A shifting mechanism for a multi-speed power transmission having a gear housing structure with an input shaft, an output shaft, and a plurality of changeable gears therein for changing the ratio of input to output speeds, said shifting mechanism comprising:

(a) a first and second reduction shift rail movably mounted to said gear housing structure and slidably movable on a longitudinal direction between a fore and aft gear charge position;

(b) an elongated final drive shaft rail slidably mounted on said gear housing structure and movable in the direction of elongation between first and second gear changing positions and disposed in spaced parallel arrangement with said first and second reduction shift rails;

(c) a final drive shift fork secured to said final drive shift rail and movable therewith, adapted for effecting final drive gear ratio changes;

(d) a first reduction shift fork slidably mounted on said first reduction rail and movable between said second and first reduction positions and adapted for effecting selected reduction gear ratio changes;

(e) a second reduction shift fork slidably mounted on said second reduction rail between third and fourth reduction positions and adapted for effecting additional selected reduction gear ratio changes;

(f) a slider guided for sliding movement on said first and second reduction shift rail;

(g) a flipper member mounted for pivotal movement on said gear casing, said flipper having an end on one side of the pivotal mount engaging said final drive fork and the end on the side of said pivotal mount engaging said slider such that movement of said slider in one direction along said rails effects movement of said final drive fork in an opposite direction; and, (h) shift stick means pivotally mounted on said gear casing and operable upon selective user movement to effect movement of selected ones of said slides, said first shift fork and said second shift fork between said gear ratio position.

8. The mechanism defined in claim 7, wherein (a) said forks extend from a common side of said array; (b) said shift stick means is mounted on one side of said array; and, (c) said shift forks and said flipper members are disposed on the opposite side of said array.

9. The mechanism defined in claim 7, wherein said reduction shift rails have a round transverse section and said slider has a bore closely fitting one of said reduction rails in a precision sliding engagement such that said slider is positioned and registered by said one reduction rail; and, said slider has a clearance hole with said other reduction rail received therethrough, said other reduction rail operative to prevent said slider from rotating about said first reduction rail.

10. The mechanism defined in claim 7, wherein said slider comprises a quadrangular frame having a recess on one side for selectively being engaged by said shift stick means and having a recess on the side opposite said one side engaging an end of said flipper member, said slider having a first pair of aligned apertures in the remaining sides with said first reduction rail slidably received therethrough and a second pair of aligned apertures in the remaining sides with said second reduction rail slidably received therethrough.

11. The mechanism defined in claim 7, wherein said slider comprises a quadrilateral frame with first side having a recess for selective engagement with said shift stick means, said first frame side disposed on one side of said planar array; said slider has a second frame side thereof opposite said first side and disposed on the opposite side of said array, said second frame side having a recess formed therein and engaging an end of said flipper member.

12. A shifting mechanism for a power transmission with an input shaft, an output shaft, and a plurality of changeable gears therein for changing the ratio of input shaft speed to output shaft in six forward speed ranges with an overdrive sixth speed range and a reverse speed range, said mechanism comprising:

(a) housing structure;

(b) first, second, third, and fourth elongated shift rails disposed in side-by-side spaced parallel arrangement in an array on said housing structure, each of said rails individually guided for sliding movement in the direction of elongation between a fore and aft speed change position;

(c) a first shift fork secured to said first shift rail and movable therewith and adapted for effecting said reverse speed range upon movement to said aft position;

(d) a second shift fork secured to said second shift rail for movement therewith between said fore and aft positions, said second shift fork adapted for effecting a first speed range in said aft position and a second speed range in said fore position;

(e) a third shift fork secured to said third shift rail and movable therewith between said fore and aft positions, said third shift fork adapted to effect a third speed range in said aft position and a fourth speed range in said fore position;

(f) a fourth shift fork secured to said fourth shift rail and movable therewith between said fore and aft positions, said fourth shift fork adapted for effecting a direct drive in said fore position and said sixth overdrive range in said aft position;

(g) flipper means pivotally mounted for movement on said housing structure, said flipper disposed on one side of said array and having a first portion thereof on one side of said pivotal mount engaging said fourth shift fork;

(h) block means mounted and guided for sliding movement on said fourth shift rail and movable between fore and aft positions, said block means operatively engaging a second portion of said flipper means disposed on the side of said pivotal mount opposite said first portion, wherein movement of said slider in one direction causes said fourth shift fork to move in an opposite direction; and, (i) shift stick means pivotally mounted for movement on said housing structure and disposed on the side of said array opposite said flipper means, said shift stick means operable upon user movement to selectively engage and move one of said first, second, and third shift forks and said slider between said fore and aft positions.

13. The shift mechanism defined in claim 12, wherein said slider means comprises a quadrilateral frame with a plurality of apertures formed in opposite sides thereof with said first and second shaft rails slidably received therethrough; and, a third side of said frame engages said shaft stick means and the fourth side thereof engages said flipper means.

14. The shift mechanism defined in claim 12, wherein said slider means comprises a member having (a) a first bore therethrough with said second shift rail received therethrough and closely interfitting said first bore such that said member is in precision sliding registry thereon, (b) a second bore therethrough with said first shift received therethrough in loosely fitting arrangement wherein said member slides on said first rail and is prevented from rotating about said second rail.

15. The shift mechanism defined in claim 12, wherein said slider means comprises a rectangular frame member having one leg thereof engaging said shift stick means on one side of said array and the leg thereof opposite said one leg engaging said flipper means on the opposite side of said array.

16. A shift mechanism for a change speed transmission having the final speed range as an overdrive, said mechanism comprising:
  (a) housing structure;
  (b) a plurality of elongated shift rails disposed in an array in spaced parallel relationship, each of said rails guided for sliding movement in the direction of elongation on said housing structure;
  (c) detent means operative to position each of said rails at a neutral position thereof;
  (d) a plurality of shift yoke means attached to one each of said rails and movable therewith in at least one direction from said neutral position; one of said yoke means adapted for effecting a next to last and final speed stage shift;
  (e) frame means pivoted on said housing structure and having portions on one side of said pivot operatively engaging said frame means and the end on the opposite side of said pivot operatively engaging said final stage shift yoke means for effecting movement thereof in a reverse direction in response to movement of said frame means in one direction, whereby neutral positioning of said final stage yoke means is determined by said final stage rail detent means.

17. The mechanism defined in claim 16, wherein said frame means engages said lever means on one side array and is adapted to be contacted by a shift stick on the opposite side array.

* * * * *